United States Patent Office 3,505,166
Patented Apr. 7, 1970

3,505,166
TRIS(MERCAPTOALKYL)CYCLOHEXANES AS
EPOXIDE RESIN CURING AGENTS
Faber B. Jones and Jack E. Reece, Bartlesville, Okla.,
assignors to Phillips Petroleum Company, a corporation of Delaware
No Drawing. Filed Oct. 13, 1967, Ser. No. 675,054
Int. Cl. B32b 27/38
U.S. Cl. 161—186         4 Claims

ABSTRACT OF THE DISCLOSURE

As new tris(mercaptoalkyl)cyclohexane compositions, 1,2,4-tris(2 - mercaptoethyl)cyclohexane and 1,3,5-tris(2-mercaptoethyl)cyclohexane, having utility as cross-linking agents for polythiols and polyepoxides which in turn are useful as adhesives and coatings upon curing.

BACKGROUND OF THE INVENTION

The direct synthesis of organic sulfur compounds, especially thiols and sulfides (thioethers), by the addition of hydrogen sulfide or thiols to olefinic materials, with or without the presence of a catalyst, has been reported by various investigators. However, there is a continued research effort being directed to the production of new thiols and better processes for producing these materials.

This invention relates to new compositions of matter and to processes for producing these new compositions of matter. In one aspect, this invention relates to novel cyclic polythiols comprising tris(mercaptoalkyl)cyclohexanes. In another aspect, this invention relates to new compounds, 1,2,4-tris(2 - mercaptoethyl)cyclohexane and 1,3,5-tris(2-mercaptoethyl)cyclohexane, derived from trivinylcyclohexanes. In another aspect, this invention relates to the preparation of polythiols from trivinylcyclohexanes. In a further aspect, this invention relates to the curing of polyepoxides using novel cyclic polythiols as curing agents.

Accordingly, an object of this invention is to provide novel thiols.

Another object of this invention is to provide a commercially feasible process for the preparation of cyclic polythiols.

Other aspects, objects, as well as the several advantages of this invention, will be apparent to those skilled in the art from a study of the specification and the appended claims.

SUMMARY OF THE INVENTION

According to the invention, cyclohexanes containing at least 3 hydrocarbon substituents having olefinic unsaturation are converted to novel tris(mercaptoalkyl)cyclohexanes.

Further, according to the invention, trivinylcyclohexanes are converted to novel tris(mercaptoethyl)cyclohexanes.

Specific novel compounds produced according to the invention are: 1,2,4-tris(2-mercaptoethyl)cyclohexane and 1,3,5-tris(2-mercaptoethyl)cyclohexane.

The tris(mercaptoalkyl)cyclohexanes of the invention are useful to cure epoxide or thiol terminated compounds to adhesives or sealants.

PREFERRED EMBODIMENTS OF THE INVENTION

The novel cyclic polythiols of the invention can be prepared by procedures known in the art. The trivinylcyclohexanes which are preferred starting materials for producing the novel cyclic polythiols of the invention can be formed by pyrolysis of 1,5,9-cyclododecatriene. The conversion of 1,5,9-cyclododecatriene at elevated temperature, and optionally in the presence of a catalyst, results in the formation of the trivinylcyclohexane compound, as is disclosed by U.S. Patent 3,011,003 and British Patent 848,-637. The trivinylcyclohexane thus produced can be converted to a novel tris(mercaptoethyl)cyclohexane of the invention by reaction with $H_2S$ in the presence of a free radical initiator, by free radical addition of an alkylthiol (such as methyl or ethyl thiol) to the trivinylcyclohexane with subsequent cleavage of the thus formed trisulfide with $H_2S$ in an acidic environment, or by the addition of thioacetic acid in the absence or presence of a free radical initiator with subsequent saponification of the tristhioacetate.

The novel tris(mercaptoethyl)cyclohexane products of this invention are normally prepared by the addition of a trioalkanoic acid to the trivinyl-cyclohexane starting material with subsequent saponification of the thus formed tristhioalkanoate. Thioacetic acid is preferably employed, though thioalkanoic acids having as many as 6 carbon atoms can be employed. Generally in the range of 1 to 20 moles of thioalkanoic acid for each mole of trivinylcyclohexane are employed, preferably in the range of 3 to 10 moles of thioalkanoic acid per mole of trivinylcyclohexane are employed. Temperatures in the range of 0 to 200° C. are employed, preferably the temperature is in the range of 40° C. to 150° C. Sufficient time to effect the desired degree of conversion should be used, generally reaction times in the range of 5 minutes to 24 hours are suitable. Though either superatmospheric or subatmospheric pressure can be employed, atmospheric pressure is normally used because of convenience. Saponification of the tristhioalkanoate product is effected by contacting that product, either with or without separation from the other materials present, with an alkaline material such as NaOH, KOH, LiOH, or the like, under conditions such that the thioester linkages are split to yield the tris(mercaptoethyl)cyclohexane product. In general, in the range of 3 to about 40 moles of alkali per mole of tristhioalkanoate are employed. The temperature can range from about 40° C. to the decomposition temperature of the product; generally, the temperature is preferably in the range of about 50° C. to the reflux temperature of the reaction medium. Pressures that are either subatmospheric or superatmospheric can be employed, though atmospheric pressure is normally preferred because of convenience. Reaction time should be sufficient to effect the degree of saponification desired; normally reaction times of about 30 minutes to 48 hours are suitable. Suitable diluents that are substantially non-reactive in the reaction environments can be employed, such as benzene, toluene, xylene, hexane, and the like. Products can be separated and purified if desired by ordinary means known to the art such as distillation, filtration, crystallization, and the like.

Free radical agents, when utilized, can be from chemical sources, or the free radicals can be supplied by energy sources which cause the formation of free radicals in situ. For example, peroxide compounds and organic azo compounds can be employed as chemical sources of free radicals, and actinic irradiation can be employed for the generation of free radicals. The terminology "actinic irradiation" as used herein includes activating rays such as ultraviolet rays having a wave length in the range 100–3800 Angstroms and ionizing rays such as alpha rays, beta rays, gamma rays, X-rays, neutrons, and the like. The ultraviolet rays can be supplied from lamps and the like, while the ionizing radiation can be supplied from such sources as cathode tubes, accelerators, natural and artificial radioactive elements, spent fuel elements from atomic reactors, and the like. If actinic irradiation is employed, the energy level of the irradiation will generally be in the range between 2.1 and $1 \times 10^8$ electron volts. The irradiation dose rate will generally be from $10^3$ to $10^{10}$ rep (roentgen equivalent physical) per hour, while the total irradiation dosage will generally be from $10^5$ to $10^{11}$ rep. The amount of chemical free radical generating agent which can be employed can vary over a wide range, but is generally less than 5 mole percent based on the trivinylcyclohexane.

Some specific examples of chemical free radical sources which can be used include di-tert alkyl peroxides, alkyl hydroperoxides, alkyl peroxy esters, diacyl peroxides, and the like. Preferred chemical free radical sources are the azo compounds such as alpha,alpha'-azo diisobutylronitrile and others such as are disclosed in U.S. Patents 2,471,959, 2,492,763, and 2,503,253.

Hygroden sulfide employed for the reaction of the trivinylcyclohexane can be in the liquid state if the pressure is high enough and the temperature relatively low. The amount of hydrogen sulfide employed will vary appreciably and will generally be in the range of about 1 to 100 moles of hydrogen sulfide per mole of trivinylcyclohexane. Although the hydrogen sulfide used according to the invention can be a crude product, it is often advantageous to distill the hydrogen sulfide prior to admixing with the trivinylcyclohexane to remove dissolved free sulfur.

The addition of $H_2S$ or alkylthiols of this invention to form the trithiols or trisulfides can be carried out in a manner like that of the prior art and can be effected in a batch, intermittent, or continuous manner. Diluents that are substantially completely non-reactive in the reaction environment can be employed. For example, compounds such as benzene, toluene, xylene, hexane, dodecane, and the like can be used. Hydrogen sulfide can be passed through the trivinylcyclohexane reactant or solution until the reaction is substantially completed, for example, for a period varying from 0.5 to 72 hours, or more, depending upon the conditions of reaction. Reaction temperature can vary over a wide range, and generally will range from about −50 to about 300° F. The pressure at which the reaction is carried out will also vary, and generally will be sufficient to maintain liquid phase conditions, although vapor phase or mixed phase conditions are possible. The pressure can vary from about atmospheric to about 1000 p.s.i.g.

No special apparatus is required to carry out the reaction in accordance with the invention. When atmospheric pressure is used, the reaction can be carried out in an open vessel, while the reaction under superatmospheric pressure can be carried out in any suitable container, such as an autoclave.

It is normally preferred to exclude air from the reaction medium in order to avoid oxidation of the trithiol or trisulfide products formed.

If trisulfides are formed by the addition of alkylthiols to trivinylcyclohexane, such trisulfides can be converted to the tris(mercaptoethyl)cyclohexane products by cleavage with $H_2S$ in an acidic environment. Pressures in the range of 10 to 1000 p.s.i.g. and temperatures in the range of 20° C. to reflux temperature at the pressure used can be employed, provided that temperatures at or above the decomposition point of any of the materials should be avoided.

Products can be recovered by any well known separation procedure. For example, gases can be recovered or released to the atmosphere, and liquids can be distilled, crystallized, or subjected to various separation and recovery procedures to obtain the desired tris(mercaptoalkyl)cyclohexane product.

As noted above, the novel cyclic polythiols of the present invention are particularly useful and valuable as curing agents for polyepoxides. The polyepoxides that can be cured to valuable adhesive by the trithiols of this invention are exemplified by the glycidyl resins of FIGURE 1, page 167, Modern Plastics Encyclopedia, 1967, Volume 44, No. 14. These epoxy resins, as they are known to the art, are common items of commerce and, in general, have 2 or more glycidyl groups per molecule. However, polyepoxides that can be cured according to the process of this invention include compounds within the following generic formula:

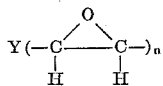

where Y is an organic group having a valence of $n$ that can contain in the range of 2 to 200 carbon atoms and, optionally, as many as 20 atoms of O, S, or N, provided that the O, S, or N atoms are bonded to carbon or atoms other than hydrogen; and where $n$ is an integer in the range of 2 to 12. Examples can include: epichlorohydrin-bis phenol A resin, epoxy-novolac resin, diglycidyl isophthalate resin, diglycidyl ether of dimerized linolic acid, 1,2,4,5-diepoxypentane, di(4,5-epoxypentyl)thiomalonate, and the like.

In curing polyepoxides with the trithiols of this invention, it is often advantageous to employ activators for the cure. Examples of these include: amines, such as diethylaminopropylamine, tri-n-butyl amine, p,p-bis(dimethylaminophenyl)methane, benzyldimethylamine, diethylenetriamine, triethylenetetraamine, dimethylaniline, and the like; phenols; organic phosphines; sulfides; organic arsines; organic antimony compounds; and the like. Particularly preferred are tertiary amines or compounds that are convertible to tertiary amines in situ.

Various other ingredients can be mixed with the polythiol or polyepoxide subjected to cure with the novel tris(mercaptoalkyl)cyclohexanes of the invention, including pigments, filler, dyes, plasticizers, resins, and the like.

The polyepoxides, for examples, can be cured with the new trithiols by merely mixing the components together, preferably in the presence of an activator. The cure time can vary from a few minutes to a few hours, depending on the type and quantity of reactants and presence of catalyst. In the presence of an activator, the cure takes place readily at room temperature. Faster reaction can be obtained, of course, by applying heat, e.g., in the range 30° C. to 200° C.

The trithiols of this invention are normally employed in amounts such that about 1 thiol group is provided for each epoxy group of the polyepoxide. Of course, reasonable variation in the range of about 0.8 to 1.2 mols of thiol groups per mole of epoxide groups can be used.

Synthesis of and utility for the novel tris(mercaptoethyl)cyclohexane compounds of this invention is demonstrated by the following examples:

EXAMPLE I

To a stirred reactor was charged 53 g. (0.33 mole) of 1,2,4-trivinylcyclohexane. A total of 91 g. (1.2 moles) of thioacetic acid was then slowly added at such rate as to maintain the temperature of the reaction mixture below 60° C. The mixture was then heated to 110° C. for 30 minutes and cooled to room temperatures to produce 1,2,4-tri-(2'-mercaptoethyl)cyclohexane triacetate, e.g., S,S,S - [2,2,2-(1,2,4-cyclohexanetriyl)trisethyl]tristhioacetate.

To the above mixture was then added a mixture comprised of 500 ml. of ethanol, 200 ml. $H_2O$, and 96 g. NaOH. Reflux was maintained for 3.5 hours, cooling was effected, neutralization was effected with HCl. An ether extract of the resultant mixture was washed with water, dried over $MgSO_4$, and evaporated to dryness to yield 51.4 g. of 1,2,4-tris(2-mercaptoethyl)cyclohexane product, boiling point 174° C.–185° C., 0.4–1.2 mm. Hg.

An infrared spectrum of the material has no bands characteristic of thioacetate groups, but has bands characteristic of thiol groups.

EXAMPLE II

To a stirred reactor were charged 11.16 g. of Epon 828,[1] 5.22 g. of the 1,2,4-tris(2-mercaptoethyl)cyclohexane product of Example I, and 0.1 g. of DMP-30.[2] The reactor contents were stirred at 25° C. and applied to aluminum coupons for lap shear tests. Gel time was about 29 minutes and temperature rose to about 90° C.

The lap shear tests made on the adhesive were effected in accordance with standard procedure, ASTM designation D1002-53T. Briefly, the test consists of placing a precleaned aluminum coupon (1.000 inch x 4.000 inch x 0.064 inch) in a silicon spray coated jig and coating one end of the coupon with the material to be evaluated. After about 30 minutes the materials to be tested have gelled sufficiently so that they will not run off. Another coupon is placed over the first coupon in such manner that only a ½ inch overlap is formed. The space between the coupons, filled with test adhesive, is generally 5 to 10 mils thick. The top of the holder is placed in position, and the assembly is ready for any cure cycle desired. After cure is effected, the bonded coupons are taken out, the excess adhesive is removed, and the mil thickness of the bond is measured. To effect uniformity, all bonding surfaces are cleaned before applying adhesive. This is effected by vapor degreasing the coupons in trichloroethylene, followed by acid etching, water washing, and oven drying. The coupons are normally used within 1 hour after drying.

Lap shear specimens prepared in the above manner were cured at 25° C. for 16 hours, 100° C. for 4 hours, and 150° C. for 4 hours, to develop full adhesive strength and effect uniformity. They were then tested to failure for tensile shear employing an Instron Model TT testing machine at a strain rate of 0.05 inch per minute. Tensile lap shear strength at room temperature, as determined in triplicate for the above adhesive, was determined to be 2,857 pounds per square inch of the bond area.

We claim:

1. A curable composition comprising a resin having two or more 1,2-epoxide groups per molecule and a curable amount of a compound selected from the group consisting of 1,2,4-tris(2-mercaptoethyl)cyclohexane and 1,3,5-tris(2-mercaptoethyl)cyclohexane.

2. The composition of claim 1 which additionally contains an activator for the cure.

3. The composition of claim 2 applied to a metal substrate to form a laminate.

4. The composition of claim 1 wherein the amount of the trithiol is about 0.8 to 1.2 moles of thiol groups per mole of epoxide groups.

---

[1] Epon 828 is a trademark for a product characterized as a diglycidyl ether of bis phenol A with an equivalent weight of 187 and a structure thus

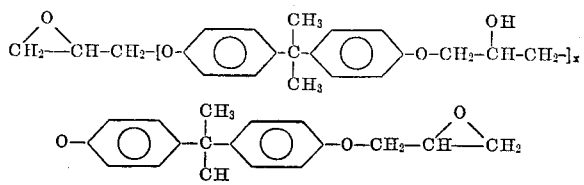

[2] DMP-30 is tris-2,4,6-(dimethylaminomethyl)phenol.

References Cited

UNITED STATES PATENTS

| | | | |
|---|---|---|---|
| 3,291,776 | 12/1966 | Newey et al. | 260—47 |
| 3,363,026 | 1/1968 | Schroll | 260—831 |
| 3,310,527 | 3/1967 | De Acetis et al. | 260—47 |
| 3,448,112 | 6/1969 | De Acetis et al. | 260—294.8 |

WILLIAM H. SHORT, Primary Examiner

E. NIELSEN, Assistant Examiner

U.S. Cl. X.R.

260—2, 47, 59, 78.4, 609